United States Patent
Miyazaki

(10) Patent No.: US 9,366,948 B2
(45) Date of Patent: Jun. 14, 2016

(54) LIGHT SOURCE APPARATUS AND PROJECTION APPARATUS

(71) Applicant: CASIO COMPUTER CO., LTD., Tokyo (JP)

(72) Inventor: Takeshi Miyazaki, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/743,736

(22) Filed: Jun. 18, 2015

(65) Prior Publication Data

US 2015/0286119 A1    Oct. 8, 2015

Related U.S. Application Data

(63) Continuation of application No. 13/607,335, filed on Sep. 7, 2012, now Pat. No. 9,094,619.

(30) Foreign Application Priority Data

Sep. 30, 2011    (JP) .................................. 2011-216647

(51) Int. Cl.
*G03B 21/00* (2006.01)
*G03B 21/20* (2006.01)
(Continued)

(52) U.S. Cl.
CPC ............ *G03B 21/204* (2013.01); *G02B 27/102* (2013.01); *G03B 21/2013* (2013.01); *H04N 9/3114* (2013.01); *H04N 9/3158* (2013.01); *H04N 9/3164* (2013.01)

(58) Field of Classification Search
CPC .......................... G03B 21/2013; G03B 21/204
See application file for complete search history.

(56) References Cited

U.S. PATENT DOCUMENTS

| 6,115,152 A | 9/2000 | Popovich et al. |
| 6,211,976 B1 | 4/2001 | Popovich et al. |

(Continued)

FOREIGN PATENT DOCUMENTS

| CN | 101825836 A | 9/2010 |
| CN | 101950083 A | 1/2011 |

(Continued)

OTHER PUBLICATIONS

Japanese Office Action (and English translation thereof) dated Jun. 23, 2015, issued in counterpart Japanese Application No. 2011-216647.

(Continued)

*Primary Examiner* — Sultan Chowdhury
*Assistant Examiner* — Danell L Owens
(74) *Attorney, Agent, or Firm* — Holtz, Holtz & Volek PC

(57) ABSTRACT

A light source unit includes a red light source, a first blue-light source, a fluorescent material, a second blue light source and an optical system. The red light source emits light in red wavelength range. The first blue-light source emits light in a first blue-wavelength range. The fluorescent material receives the light in the first blue-wavelength range and emits light in a green wavelength range. The second blue-light source emits light in a second blue-wavelength range whose wavelengths are longer than those in the first blue-wavelength range. An optical system guides the light emitted from the red light source, the light emitted from the second blue-light source, and the light emitted from the fluorescent material, along a unique optical path.

2 Claims, 6 Drawing Sheets

(51) Int. Cl.
*G02B 27/10* (2006.01)
*H04N 9/31* (2006.01)

(56) References Cited

U.S. PATENT DOCUMENTS

| | | |
|---|---|---|
| 8,602,562 B2 | 12/2013 | Miyamae |
| 2005/0041000 A1 | 2/2005 | Plut |
| 2005/0270775 A1 | 12/2005 | Harbers et al. |
| 2006/0227302 A1 | 10/2006 | Harbers et al. |
| 2009/0034284 A1* | 2/2009 | Li .................... G03B 33/06 362/554 |
| 2010/0220298 A1 | 9/2010 | Wang et al. |
| 2012/0062857 A1 | 3/2012 | Saitou et al. |
| 2012/0243205 A1* | 9/2012 | Lin .................... G03B 21/204 362/84 |

FOREIGN PATENT DOCUMENTS

| | | |
|---|---|---|
| CN | 101995748 A | 3/2011 |
| JP | 2002525646 A | 8/2002 |
| JP | 2004341105 A | 12/2004 |
| JP | 2009194161 A | 8/2009 |
| WO | 2011092841 A1 | 8/2011 |

OTHER PUBLICATIONS

Chinese Office Action dated Jun. 25, 2014 issued in counterpart Chinese Application No. 201210350238.8.

Chinese Office Action dated Jan. 13, 2015, issued in counterpart Chinese Application No. 201210350238.8.

* cited by examiner

LIGHT SOURCE APPARATUS AND PROJECTION APPARATUS

CROSS-REFERENCE TO RELATED APPLICATIONS

This application is a Continuation application of U.S. Ser. No. 13/607,335, filed Sep. 7, 2012, which is based upon and claims the benefit of priority from prior Japanese Patent Application No. 2011-216647, filed Sep. 30, 2011, the entire contents of which are incorporated herein by reference.

BACKGROUND OF THE INVENTION

1. Field of the Invention

The present invention relates to a light source apparatus using a semiconductor light emitting device and a projection apparatus comprising the light source apparatus.

2. Description of the Related Art

There have been various proposals concerning a conventional projection apparatus which projects images by using a semiconductor light emitting device as a light source. For example, according to Jpn. Pat. Appln. KOKAI Publication No. 2004-341105, a semiconductor light emitting device is employed as a light source which irradiates ultraviolet light. Further, according to Jpn. Pat. Appln. KOKAI Publication No. 2004-341105, fluorescent materials, which receive ultraviolet light and emit red, green and blue light, are illuminated with light from a light source, in order that arbitrary light can be thereby projected onto a projection plane.

In recent years, there has been proposed a projection apparatus which projects images by using a semiconductor light emitting device which radiates visible light. For example, a fluorescent material which receives light in a blue wavelength range and emits green light is provided, and the fluorescent material is illuminated with blue light. In such a projection apparatus, light emission efficiency of green light can be improved by illuminating the fluorescent material with light in a blue wavelength range adequate for exciting the fluorescent material. However, normally, a blue wavelength range adequate for exciting a fluorescent material does not support chromaticity standards such as Standard RGB (sRGB). Inversely, a light emitting wavelength of a blue light source is made to support the chromaticity standard such as sRGB, light emission efficiency of the fluorescent material deteriorates.

BRIEF SUMMARY OF THE INVENTION

The present invention has an object of providing a light source apparatus capable of improving both the light emission efficiency of light in a green wavelength range and the color reproducibility of light in a blue wavelength range, and a projection apparatus comprising the light source apparatus.

According to one aspect of the invention, there is provided a light source apparatus including: a red light source which emits light in a red wavelength range; a first blue-light source which emits light in a first blue-wavelength range; a fluorescent material which receives the light in the first blue-wavelength range and emits light in a green wavelength range; a second blue-light source which emits light in a second blue-wavelength range whose wavelengths are longer than those in the first blue-wavelength range; and an optical system which guides the light emitted from the red light source, the light emitted from the second blue-light source, and the light emitted from the fluorescent material, in a unique optical path.

A projection apparatus according to the other aspect of invention projects, to a predetermined projection plane, light emitted from the light source apparatus according to the one aspect.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the invention will be described hereinafter with reference to the accompanying drawings. In descriptions below, a light source apparatus according to each of the embodiments will be described with reference to application to a data projection apparatus of a DLP (registered trademark) method.

First Embodiment

Figure 1:
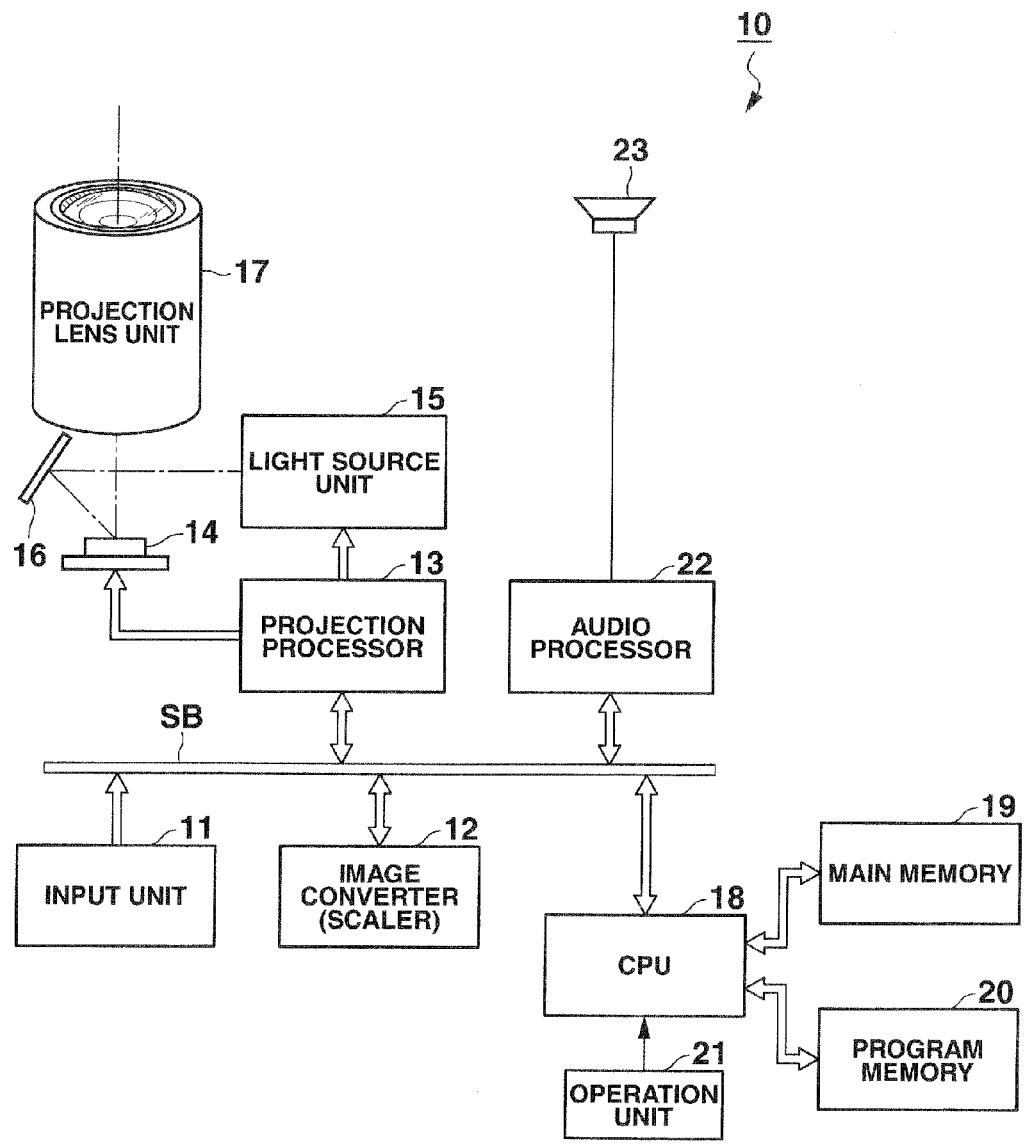
FIG. 1 shows a schematic functional configuration of a data projection apparatus according to embodiments of the invention.

The first embodiment of the invention will be described first. FIG. 1 shows a schematic functional configuration of a data projection apparatus according to the embodiments of the invention. If descriptions below include an expression that "light" is reflected by a "mirror", the expression means that the mirror totally reflects incident light, in principle.

An input unit 11 is configured by a video input terminal and audio input terminals of a pin jack (RCA) type, and a high-definition multimedia interface (HDMI: registered trademark) input terminal. The input unit 11 is input with image data and audio data according to various standards such as the NTSC system, from an external signal supply source outside the data projection apparatus 10, and feeds the image data to an image converter 12 through a system bus SB as well as the audio data to an audio processor 22. If the input image data and audio data are analogue signals, the input unit 11 firstly digitizes and then feeds the image data and audio data to the image converter 12.

The image converter 12 is also referred to as a scaler. The image converter 12 converts the image data input from the input unit 11 into image data of a predetermined format adequate for projection, and then feeds the converted image data to a projection processor 13. At this time, the image converter 12 superposes, on the image data, data such as symbols indicating various operation states for the purpose of on screen display (OSD) if necessary.

The projection processor 13 drives a micromirror element 14 as a spatial optical modulator in accordance with image data fed from the image converter 12. A drive cycle of the micromirror element 14 is set in accordance with a value obtained by multiplying a frame rate of image data, a division number of color components, and a number of display gradations of image data. For example, the drive cycle of the micromirror element 14 is 1/(60*3*256)=1/46080 second where the frame rate is 60 fps, the division number of color components is 3 (three colors of RGB), and the number of display gradations is 256. The projection processor 13 drives the light source unit 15 in accordance with the image data fed from the image converter 12.

The micromirror element 14 is configured by a plurality of movable micromirrors arranged on an array. The micromirrors are arrayed to correspond to, for example, the wide extended graphic array (WXGA [1280 pixels horizontally× 800 pixels vertically]). Each of the micromirrors is configured to be able to change a tilt angle at a high speed. Further, each of the micromirrors changes a light emission path of incident light entering from the light source unit 15 in accordance with the tilt angle. Specifically, when a micromirror is on, the micromirror reflects incident light toward a projection lens unit 17. When a micromirror is off, the micromirror reflects incident light toward outside of the projection lens unit 17.

The light source unit 15 as a light source apparatus in the present embodiment time-divisionally emits light of a plurality of colors including primary colors red, green, and blue toward a mirror 16. Details of the configuration of the light source unit 15 will be described later. The mirror 16 totally reflects incident light from the light source unit 15 toward the micromirror element 14.

The projection lens unit 17 internally comprises an optical system which is configured to project an optical image formed of reflection light from the micromirror element 14, onto a projection plane not shown.

A CPU 18 controls operations of circuits described above. The CPU 18 is connected to a main memory 19 and a program memory 20. The main memory 19 is configured, for example, by a SRAM and functions as a work memory for control performed by the CPU 18. The program memory 20 is configured by an electrically rewritable non-volatile memory, and stores operation programs to be performed by the CPU 18, and data in various standard formats.

The CPU 18 is also connected to an operation unit 21. The operation unit 21 comprises a key operation unit provided on a body of the data projection apparatus 10, and an infrared-light receiving unit which receives infrared light from a remote controller not shown but specialized only for the data projection apparatus 10. When a user operates the key operation unit or the remote controller, the operation unit 21 outputs operation signals corresponding to the user's operations. The CPU 18 controls various operations of the data projection apparatus 10 in accordance with the operation signals.

Further, the CPU 18 is also connected to the audio processor 22 through the system bus SB. The audio processor 22 comprises a sound source circuit such as a PCM sound source. The audio processor 22 transforms audio data input through the input unit 11 into an analogue audio signal, and outputs the analogue audio signal to a loudspeaker unit 23 to drive the unit 23. Accordingly, the loudspeaker unit 23 produces sound. The audio processor 22 also generates a beep sound from the loudspeaker unit 23 if necessary.

Figure 2:
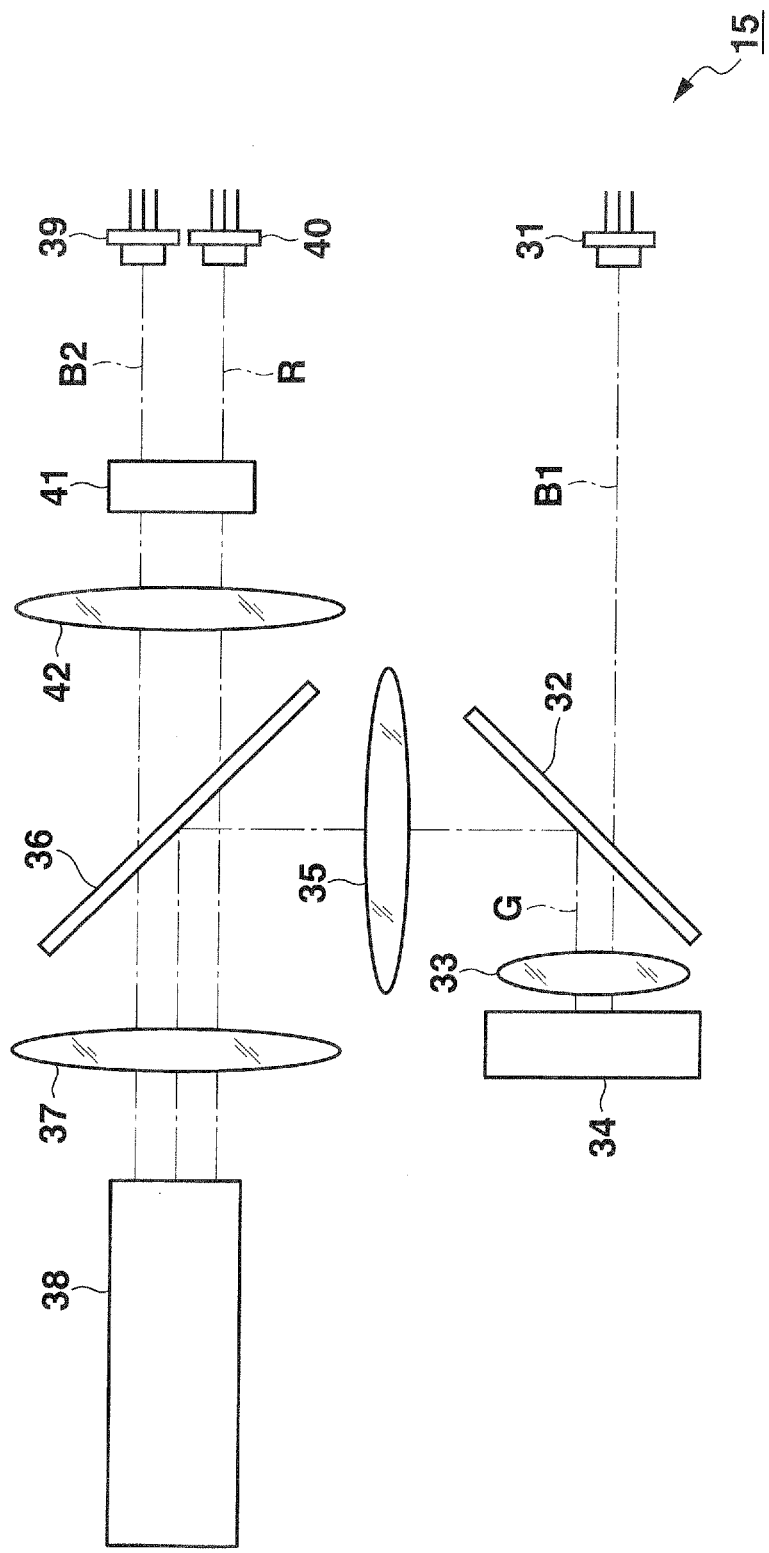
FIG. 2 shows an example of configuration of a light source unit according to the first embodiment of the invention.

FIG. 2 shows an example of configuration of the light source unit 15 according to the first embodiment of the invention. The light source unit 15 in the present embodiment is configured to emit of any one of red, green, and blue light from a light emitting part by using three semiconductor light emitting devices.

A first blue-light source 31 is a semiconductor light emitting device which emits light B1 in a first blue-wavelength range, and is configured by, for example, a laser diode. The first blue-wavelength range is a wavelength range adequate for exciting a fluorescent material 34, for example, a wavelength range of 440 to 445 nm. More desirably, the first blue-light source 31 is configured to emit blue light having a wavelength of 445 nm. Although FIG. 2 shows only one first blue-light source 31, a plurality of light sources are arrayed in a matrix (in a plane) in actual.

A dichroic mirror 32 is provided on an optical axis of the first blue-light source 31 and is configured to reflect light in a green wavelength range and to allow light in the other wavelength range to pass. Dichroic mirror 32 is positioned at an angle of 45 degrees to an optical axis of a lens 33 which will be described later.

Lens 33 converges blue light B1 passing through dichroic mirror 32 and green light G emitted from the fluorescent material 34. FIG. 2 shows only one lens 33. However, the same function as lens 33 may alternatively be achieved by a plurality of lenses.

The fluorescent material 34 is configured by applying, onto a surface thereof, a fluorescent material which is excited by light of a predetermined wavelength, for example, 445 nm, and emits light in the green wavelength range. The fluorescent material 34 receives blue light B1 passing through lens 33 and emits green light G toward lens 33.

A lens 35 is provided on a reflection light axis of dichroic mirror 32 and converges the green light G emitted from the fluorescent material 34 and passing through dichroic mirror 32. Like lens 33, lens 35 may be configured by a plurality of lenses.

A dichroic mirror 36 is configured to reflect light in the green wavelength range and to allow light in the other wavelength range to pass, like dichroic mirror 32. Dichroic mirror 36 is positioned at an angle of 45 degrees to an optical axis of lens 35.

A lens 37 is provided on a reflection light axis of dichroic mirror 36, and converges incident light. Like lenses 33 and 35, lens 37 may be configured by a plurality of lenses.

A light tunnel 38 internally totally reflects incident light from lens 37 to travel and emits the light as uniform planar light. The light tunnel 38 functions as a light emitting part of the light source unit 15.

A second blue-light source 39 is a semiconductor light emitting device which emits light B2 in a second blue-wavelength range shifted to a longer wavelength side than the first blue-wavelength range. For example, the second blue-light source 39 is configured by a laser diode. The second blue-wavelength range is a wavelength range corresponding in chromaticity to "standard blue" defined by a standard RGB (sRGB) color space, for example, a wavelength range of 460 to 480 nm. Although FIG. 2 shows only one second blue-light source 39, a plurality of light sources are arrayed in a matrix (in a plane) in actual.

A red light source 40 is a semiconductor light emitting device which emits light R in a red wavelength range, and is configured by, for example, a light emitting diode or a laser diode. In the example of FIG. 2, the red light source 40 is positioned in a manner that emitted light thereof has an optical axis parallel to the optical axis of emitted light from the second blue-light source 39. Although FIG. 2 shows only one red light source 40, a plurality of light sources are arrayed in a matrix (in a plane) in actual.

A diffusion plate 41 allows blue light B2 from the second blue-light source 39 to pass while diffusing blue light B2. The diffusion plate 41 is driven to rotate or vibrate by a motor not shown when blue light B2 or red light R passes through and is diffused by the diffusion plate.

A lens 42 is provided so as to converge diffused light from the diffusion plate 41. Like lenses 33, 35, and 37, lens 42 may be configured by a plurality of lenses.

In the light source unit 15 shown in FIG. 2, the diffusion plate 41, lens 42, dichroic mirror 36, and lens 37 function as a first optical-guide system and a fourth optical-guide system. Further, dichroic mirror 32 and lens 33 function as a second optical-guide system. Lens 33, dichroic mirror 32, lens 35, dichroic mirror 36, and lens 37 function as a third optical-guide system. Configurations of the optical guide systems shown in FIG. 2 are merely examples and can appropriately be modified. Specifically, any optical system, which is configured to be able to guide the red light R emitted from the red light source 40 to the light tunnel 38, can function as the first optical-guide system. Similarly, any optical system, which is configured to be able to guide blue light B1 emitted from the first blue-light source 31 to the fluorescent material 34, can function as the second optical-guide system. Further, any optical system, which is configured to be able to guide the green light G emitted from the fluorescent material 34 to the light tunnel 38, can function as the third optical-guide system. Still further, any optical system, which is configured to be able to guide blue light B2 emitted from the second blue-light source 39 to the light tunnel 38, can function as the fourth optical-guide system.

Operation of the light source unit 15 shown in FIG. 2 will now be described. The projection processor 13 performs operation of the light source unit 15 under control of the CPU 18. The projection processor 13 controls light emission timing the first blue-light source 31, second blue-light source 39, and red light source 40 in the light source unit 15, so as to project an image expressed by image data onto a projection plane.

Projection images forming one frame (one screen) are configured by projection images for a plurality of fields. In each field, projection images of different colors are projected onto the projection plane. One frame includes at least three fields of a field R, a field G, and a field B. In field R, a red projection image is projected onto the projection plane. In field G, a green projection image is projected onto the projection plane. In field B, a blue projection image is projected onto the projection plane.

Figure 3:
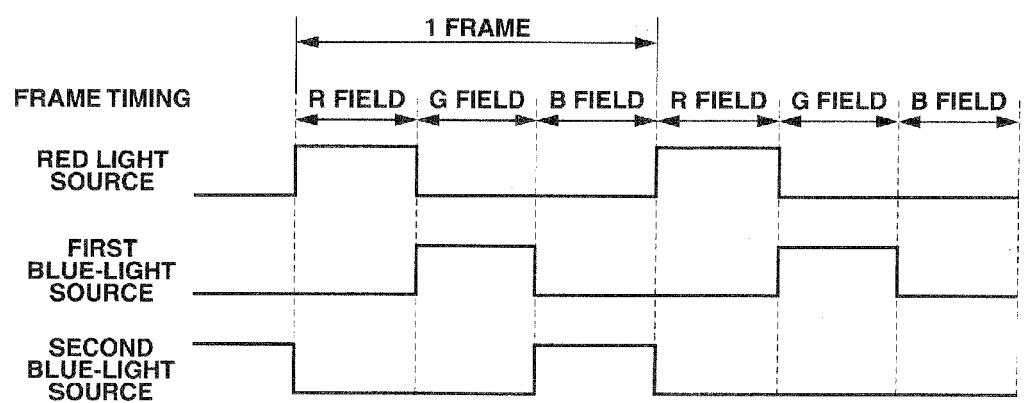
FIG. 3 is a timing chart showing operation of the light source unit according to the first embodiment of the invention.

FIG. 3 is a timing chart showing operation of the light source unit 15. In field R, the projection processor 13 makes the red light source 40 emit light. The red light R emitted from the red light source 40 is diffused by the diffusion plate 41 and is converged lens 42, and reaches dichroic mirror 36. As described above, dichroic mirror 36 is configured to allow light other than that in the green wavelength range to pass. Therefore, the red light R passes through dichroic mirror 36 and is converged by lens 37, and enters the light tunnel 38. Further, the red light R is reflected by an inner surface of the light tunnel 38 and is emitted as uniform planar light from the light tunnel 38, and reaches the micromirror element 14.

The projection processor 13 controls the micromirrors to turn on/off in accordance with gradations of red components of input image data where the micromirrors form the micromirror element 14. As described above, each of the micromirrors forming the micromirror element 14 reflects incident light toward the projection lens unit 17 when turned on. When turned off, each of the micromirrors reflects the incident light toward outside of the projection lens unit 17. In such a configuration, the red light R is
projected onto pixel positions on the projection plane, by a number of times when the micromirrors are turned on in field R, the pixel positions corresponding to the micromirrors turned on. Averaged by time, this operation is equivalent to projection of a red projection image having gradations according to image data.

In field G, the projection processor 13 makes the first blue-light source 31 emit light. Blue light B1 emitted from the first blue-light source 31 reaches dichroic mirror 32. As described above, dichroic mirror 32 is configured to allow light other than that in the green wavelength range to pass. Therefore, blue light B1 passes through dichroic mirror 32 and is converged by lens 33, and enters the fluorescent material 34. Upon receiving blue light B1, the green light G is emitted from the fluorescent material 34. Blue light B1 is light in a wavelength range adequate for exciting the fluorescent material 34. Therefore, the present embodiment is capable of increasing light emission efficiency of the green light G.

The green light G emitted from the fluorescent material 34 is converged by lens 33 and is reflected by dichroic mirror 32. The green light G is then converged by lens 35 and reaches dichroic mirror 36. Further, the green light G is reflected by dichroic mirror 36 and is converged by lens 37, and enters the light tunnel 38.

The projection processor 13 controls the micromirrors of the micromirror element 14 to turned on/off in accordance with gradations of green components of input image data. In this manner, green image which has predetermined gradations on time average is projected.

In field B, the projection processor 13 makes the second blue-light source 39 emit light. Blue light B2 emitted from the second blue-light source 39 is diffused by the diffusion plate 41 and is converged by lens 42, and reaches dichroic mirror 36. As described above, dichroic mirror 36 is configured to allow light other than that in the green wavelength range to pass. Therefore, blue light B2 passes through dichroic mirror 36 and is converged by lens 37, and enters the light tunnel 38. Further, blue light B2 is reflected by the inner surface of the light tunnel 38 and is emitted as uniform planar light from the light tunnel 38, and reaches the micromirror element 14.

Also, the projection processor 13 controls the micromirrors of the micromirror element 14 to turn on/off in accordance with gradations of blue components of input image data. In this manner, a blue image which has predetermined gradations on time average is projected. Blue light B2 is light in a wavelength range adequate for blue display. Therefore, the
present embodiment can display blue color with excellent color reproducibility.

Through the operations described above in one frame, project on images of arbitrary colors can be displayed at arbitrary pixel positions on the projection plane, on time average. In FIG. 3, the light sources are caused to emit light in fields R, G, and B in the first frame. Averaged by time, therefore, equivalence to projection of a white projection image is achieved. In the second frame, the light sources are caused to emit light in fields R and G. On time average, equivalence to projection of a yellow projection image is achieved.

Optionally, a field in which a plurality of light sources are caused to simultaneously emit light may be added. For example, if a field W (white) in which the red light source 40, first blue-light source 31, and second blue-light source 39 are caused to simultaneously emit light is additionally included in one frame, luminance of projection images can be controlled.

As has been described above, according to the present embodiment, there are provided blue light sources specialized respectively for exciting the fluorescent material 34 and for blue projection images. In this manner, the light emission efficiency of light in the green wavelength range and the color reproducibility of light in the blue wavelength range can both be improved.

Second Embodiment

Next, the second embodiment of the invention will be described. The second embodiment uses a second blue-light source to excite a fluorescent material. The same schematic functional configuration of the data projection apparatus 10 as described with reference to FIG. 1 is applicable also to the present embodiment. Descriptions thereof will be therefore omitted.

Figure 4:
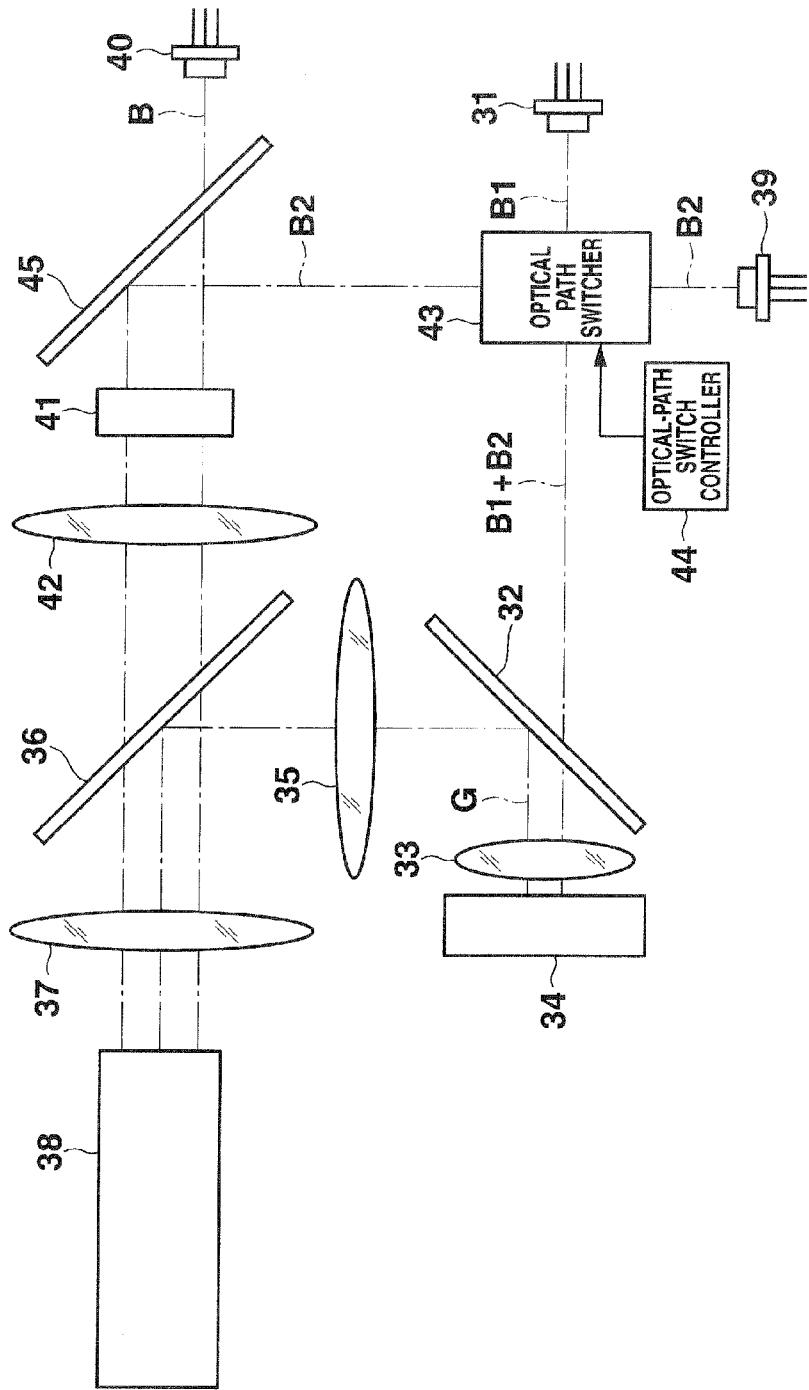
FIG. 4 shows an example of configuration of a light source unit according to the second embodiment of the invention.

FIG. 4 shows an example of the configuration of a light source unit 15 according to the second embodiment of the invention. Features of the configuration which are identical to or correspond to those of FIG. 2 will be denoted at the same reference signs as denoted in FIG. 2.

The first blue-light source 31 is the same as that described in FIG. 1, and is preferably configured to emit blue light B1 having a wavelength of 445 nm. The second blue-light source 39 is configured to emit blue light B2 in a wavelength range corresponding in chromaticity to "standard blue" defined by a color space such as standard RGB (sRGB), for example, wavelength range of 460 to 480 nm. In the second embodiment, the first blue-light source 31 and the second blue-light source 39 are positioned at an angle of 90 degrees relative to each other, as shown in FIG. 4, and rays of light emitted from the light sources cross each other at a predetermined position.

An optical-path switcher 43 is provided at a point of intersection of a light emission path of the first blue-light source 31 and a light emission path of the second blue-light source 39. The optical-path switcher 43 guides blue light B1 from the first blue-light source 31 to a dichroic mirror 32, and guides blue light B2 from the second blue-light source 39 to dichroic mirror 32 or a dichroic mirror 45. Although details will be described later, the optical-path switcher 43 guides blue light B2 to dichroic mirror in a first operation in a field G, and guides blue light B2 to dichroic mirror 45, in a second operation in a field B.

An optical-path switch controller 44 time-divisionally controls switching of optical paths by the optical-path switcher 43. The control of the optical-path switch controller 44 is performed by the projection processor 13 under control of the CPU 18.

Dichroic mirror 32 is the same as that described with reference to FIG. 1, and is configured to reflect light in a green wavelength range and to allow light other than that in the green wavelength range to pass. Dichroic mirror 32 is positioned at 45 degrees to the optical axis of a lens 33.

Lens 33 is the same as that described with reference to FIG. 1, and is positioned on the optical axis of the first blue-light source 31. Lens 33 converges mixed light of blue light B1 and B2 passing through dichroic mirror 32 and green light G emitted from a fluorescent material 34.

The fluorescent material 34 is configured by applying, to a surface thereof, a fluorescent material, which is excited by light of a predetermined wavelength, for example, light of wavelength 445 nm and emits light in the green wavelength range. The fluorescent material 34 receives blue light B1 passing through lens 33 and emits green light G toward lens 33.

A lens 35 is the same as that described with reference to FIG. 1. Lens 35 is provided on a reflection light axis of dichroic mirror 32, and converges green light G emitted from the fluorescent material 34 and passing through dichroic mirror 32.

A dichroic mirror 36 is the same as that described with reference to FIG. 1, and is configured to reflect light in the green wavelength range and allow light other than that in the green wavelength range to pass, like dichroic mirror 32. Dichroic mirror 36 is positioned at 45 degrees to the optical axis of lens 35.

A lens 37 is the same as that described with reference to FIG. 1. Lens 37 is provided on a reflection light axis of dichroic mirror 36, and converges incident light.

A light tunnel 38 is the same as that described with reference to FIG. 1. The light tunnel 38 internally totally reflects incident light from lens 37 to travel, and emits the light as uniform planar light.

A red light source 40 is the same as that described with reference to FIG. 1, and is configured by a semiconductor light emitting device which emits light R in a red wavelength range, for example, a light emitting diode or a laser diode.

A dichroic mirror 45 is configured to reflect light in a blue wavelength range and to allow light other than that in the blue wavelength range to pass. Dichroic mirror 45 is positioned at 45 degrees to the optical axis of the red light source 40 and also to a light, emission axis of blue light B2 of an optical-path switcher 43.

A diffusion plate 41 corresponds to that described with reference to FIG. 1, and allows light from dichroic mirror 45 to pass while diffusing the light.

A lens 42 is the same as that described with reference to FIG. 1, and is positioned to converge diffused light from the diffusion plate 41.

In the light source unit 15 shown in FIG. 4, dichroic mirror 45, diffusion plate 41, lens 42, dichroic mirror 36, and lens 37 function as a first optical-guide system and a fourth optical-guide system. Dichroic mirror 32 and lens 33 function as a second optical-guide system. Lens 33, dichroic mirror 32, lens 35, dichroic mirror 36, and lens 37 function as a third optical-guide system. Configurations of the optical guide systems shown in FIG. 4 are merely examples and can appropriately be modified.

Figure 5:
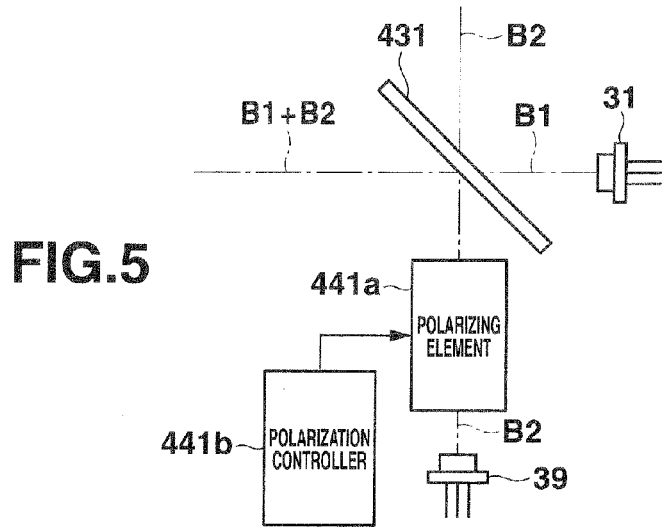
FIG. 5 shows an example of the first configuration of an optical-path switcher and an optical-path switch controller.

FIG. 5 shows an example of the first configuration of the optical-path switcher 43 and an optical-path switch controller 44. In the example of FIG. 5, the optical-path switcher 43 is configured by a polarization beam splitter 431, and the optical-path switch controller 44 is configured by a polarization beam element 441a and a polarization controller 441b.

The polarization beam splitter 431 is configured to allow light having the same plane of polarization as blue light B1 to pass, and to reflect light having a plane of polarization perpendicular to blue light B1. The polarization beam splitter 431 is positioned at an angle of 45 degrees to each of a light emission path of the first blue-light source 31 and a light emission path of the second blue-light source 39. The configuration of the polarization beam splitter 431 is merely an example and can be modified. For example, the polarization beam splitter 431 may be configured to reflect light having the same plane of polarization as blue light B1 and to allow light having a plane of polarization perpendicular to blue light B1 to pass. In this case, the positional relationship between dichroic mirror 32 and dichroic mirror 45 may be reversed from that shown in FIG. 4.

The polarizing element 441a changes the plane of polarization of incident light. The polarizing element 441a may be an element, such as a liquid crystal element which changes the plane of polarization of incident light by application of a voltage. Otherwise, the polarizing element may be an element configured to change the plane of polarization of incident light by generating a magnetic field in the element by application of the Faraday effect. The polarization controller 441b controls polarization states of incident light by the polarizing element 441a. For example, when the polarizing element 441a is configured by a liquid crystal element, the polarization controller 441b controls a voltage applied to the polarizing element 441a.

In the configuration shown in FIG. 5, when the polarization controller 441b controls the polarizing element 441a in a manner that the plane of polarization of blue light B2 emitted from the polarizing element 441a differs from the plane of polarization of blue light B1, blue light B1 passes through the polarization beam splitter 431 and is guided to dichroic mirror 32, and blue light B2 is reflected by the polarization beam splitter 431 and is guided to dichroic mirror 32. On the other side, when the polarization controller 441b controls the polarizing element 441a in a manner that the plane of polarization of blue light B2 emitted from the polarizing element 441a is the same as the plane of polarization of blue light B1, blue light B1 passes through the polarization beam splitter 431 and is guided to dichroic mirror 32, and blue light B2 passes through the polarization beam splitter 431 and is guided to dichroic mirror 45.

Figure 6A:
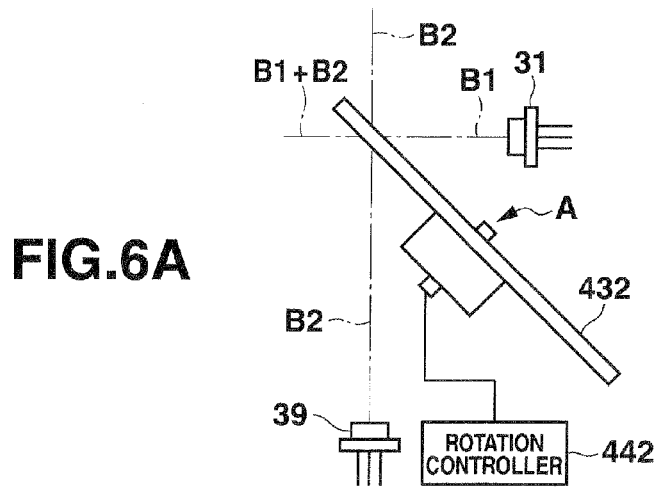
FIGS. 6A and 6B show an example of the second configuration of an optical-path switcher and an optical-path switch controller.
Figure 6B:
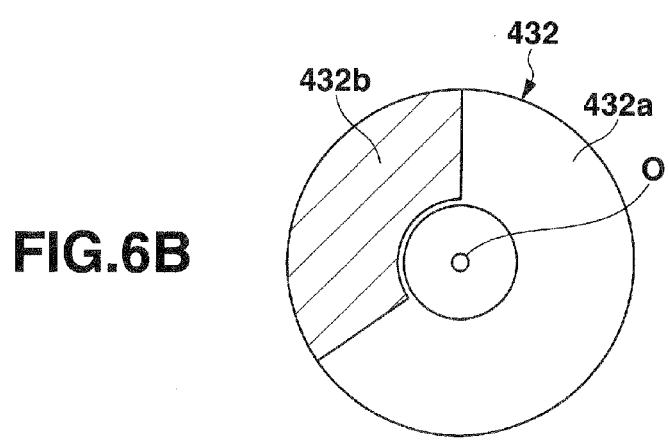

FIGS. 6A and 6B show an example of the second configuration of the optical-path switcher 43 and optical-path switch controller 44. FIG. 6A shows an example in which the optical-path switcher 43 is configured by a dichroic wheel 432 and the light-pass switch controller 44 is configured by a rotation controller 442. FIG. 6B is a front view of the dichroic wheel 432 viewed from a direction A in FIG. 6A.

The dichroic wheel 432 is configured to be rotatable about an axis of rotation O, and is positioned at an angle of 45 degrees to each of the light emission path of the first blue-light source 31 and the light emission path of the second blue-light source 39. Further, as shown in FIG. 6B, a first region 432a and a second region 432b are formed on a circumferential surface of the dichroic wheel 432. The first region 432a is a region of a dichroic filter configured to allow light in a first blue-wavelength range to pass, and to reflect light in the other wavelength range. On the other side, the second region 432b is, for example, a glass-made region which allows light in both first and second blue-wavelength ranges to pass.

The rotation controller 442 is configured by a motor and a drive circuit thereof. The motor rotates the dichroic wheel 432 about the axis of rotation O thereof. The drive circuit drives the motor.

In the configuration shown in FIGS. 6A and 6B, when the rotation controller 442 rotates the dichroic wheel 432 to make both blue light B1 and B2 enter the first region 432a (i.e., when the first region 432a is positioned at a point of intersection of optical paths of blue light B1 and B2), blue light B1 passes through the dichroic wheel 432 and is guided to dichroic mirror 32, and blue light B2 is reflected by the dichroic wheel 432 and is guided to dichroic mirror 32. On the other side, when the rotation controller 442 rotates the dichroic wheel 432 to make both blue light B1 and B2 enter the second region 432b (i.e., when the second region 432b is positioned at a point of intersection of optical paths of blue light B1 and B2), blue light B1 passes through the dichroic wheel 432 and is guided to dichroic mirror 32, and blue light B2 passes through the dichroic wheel 432 and is guided to dichroic mirror 45.

Figure 7:
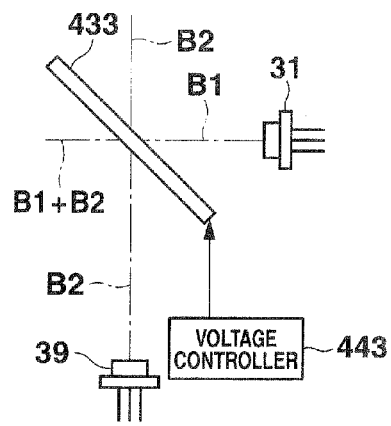
FIG. 7 shows an example of the third configuration of an optical-path switcher and an optical-path switch controller.

FIG. 7 shows an example of the third configuration of the optical-path switcher 43 and the optical-path switch controller 44. In the example of FIG. 7, the optical-path switcher 43 is configured by a holographic optical element 433, and the optical-path switch controller 44 is configured by a voltage controller 443.

The holographic optical element 433 is configured to change a light emission path of incident light by states of voltage application. Details of this element are disclosed in, for example, Jpn. PCT National Publication No. 2002-525646. The holographic optical element 433 according to the present embodiment is configured as follows. When a first voltage is applied, the holographic optical element 433 allows light having the same plane of polarization as blue light B1 to pass and reflects light having the same plane of polarization as blue light B2. When a second voltage different from the first voltage is applied, the holographic optical element 433 allows both the light having the same plane of polarization as blue light B1 and the light having the same plane of polarization as blue light B2 to pass. The holographic optical element 433 is positioned at 45 degrees to each of the light emission paths of the first blue-light source 31 and the second blue-light source 39.

The voltage controller 443 applies a first or second voltage to the holographic optical element 433.

In the configuration shown in FIG. 7, when the voltage controller 443 applies the first voltage to the holographic optical element 433, blue light B1 passes through the holographic optical element 433 and is guided to dichroic mirror 32, and blue light B2 is reflected by the holographic optical element 433 and is guided to dichroic mirror 32. On the other side, when the voltage controller 443 applies the second voltage to the holographic optical element 433, blue light B1 passes through the holographic optical element 433 and is guided to dichroic mirror 32, and blue light B2 also passes through the holographic optical element 433 and is guided to dichroic mirror 45.

According to the configurations shown in FIGS. 5, 6A, 6B, and 7, the light emission path of blue light B2 can be switched time-divisionally.

Operation of the light source unit 15 shown in FIG. 4 will be described. In the same manner as the light source unit 15 shown in FIG. 2 operates, operation of the light source unit 15 shown in FIG. 4 is also performed by the projection processor 13. The projection processor 13 controls light emission timings of the first blue-light source 31, second blue-light source 39, and red light source 40 so as to project an image expressed by image data onto the projection plane.

Figure 8:
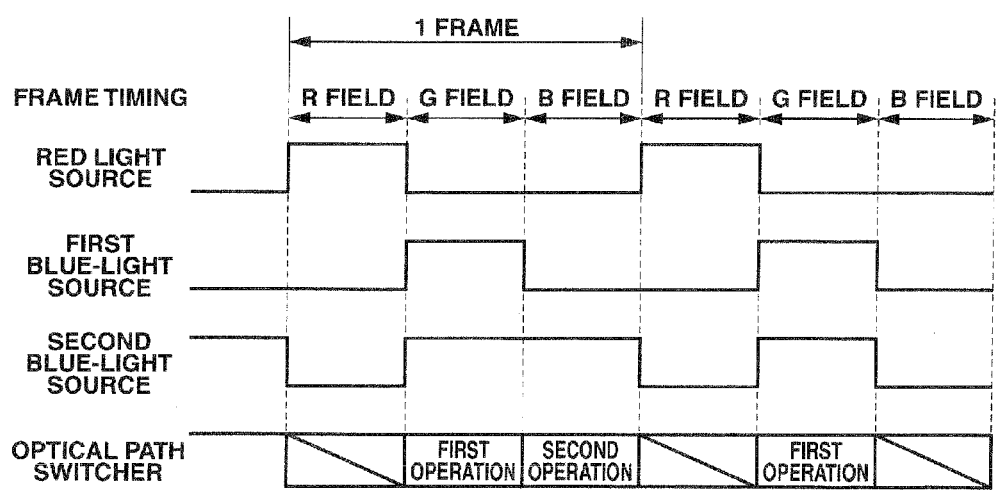
FIG. 8 is a timing chart showing operation of the light source unit according to the second embodiment of the invention.

FIG. 8 is a timing chart showing operation of the light source unit 15. In field R, the projection processor 13 makes the red light source 40 emit light. In field R, neither the first, blue-light source 31 nor the second blue-light source 39 is caused to emit light, the projection processor 13 does not control the optical-path switch controller 44. The red light R emitted from the red light source 40 reaches dichroic mirror 45. As has been described above, dichroic mirror 45 is configured to allow light other than that in the blue wavelength range to pass. Therefore, the red light R passes through dichroic mirror 45, is diffused by the diffusion plate 41, is converged by lens 42, and reaches dichroic mirror 36. Further, the red light R passes through dichroic mirror 36 and is converged by lens 37, and enters the light tunnel 38. The red light R is reflected by an inner surface of the light tunnel 38, is emitted as uniform planar light from the light tunnel 38, and reaches a micromirror element 14.

The projection processor 13 controls micromirrors of the micromirror element 14 to turn on/off in accordance with gradations of red components of input image data. In this manner, a red image which has predetermined gradations on time average is projected.

In field G, the projection processor 13 makes the first blue-light source 31 and second blue-light source 39 emit light. Also, the projection processor 13 controls the optical-path switch controller 44 to make the optical-path switcher 43 perform a first operation (of allowing blue light B1 to pass and reflecting blue light B2). Blue light B1 emitted from the first blue-light source 31 and blue light B2 emitted from the second blue-light source 39 reach the optical-path switcher 43. Further, blue light B1 and B2 are guided to dichroic mirror 32. As has been described above, dichroic mirror 32 is configured to allow light, other than that in the green wavelength range to pass. Therefore, blue light B1 and B2 pass through dichroic mirror 32, are converged by lens 33, and enter the fluorescent material 34. Upon receiving blue light B1 and B2, the green light G is emitted from the fluorescent material 34. By exciting the fluorescent material 34 with both blue light B1 and B2, light emission efficiency of the green light G can be more improved than in the first embodiment.

The green light G emitted from the fluorescent material 34 is converged by lens 33, and is reflected by dichroic mirror 32. The green light G is further converged by lens 35 and reaches dichroic mirror 36. Further, the green light G is reflected by dichroic mirror 36 and is converged by lens 37, and enters the light tunnel 38.

The projection processor 13 controls the micromirrors of the micromirror element 14 in accordance with gradations of green components of input image data. In this manner, a green image which has predetermined gradations on time average is projected.

In field B, the projection processor 13 makes the second blue-light source 39 emit light. Also, the projection processor 13 controls the optical-path switch controller 44 to make the optical-path switcher 43 perform a second operation (of allowing both blue light B1 and B2 to pass). Blue light B2 emitted from the second blue-light source 39 reaches the optical-path switcher 43. Further, blue light B2 is guided to dichroic mirror 45. As described above, dichroic mirror 45 is configured to reflect light in the blue wavelength range. Therefore, blue light B2 is reflected by dichroic mirror 45, and is diffused by the diffusion plate 41. Blue light B2 is then converged by lens 42 and reaches dichroic mirror 36. As has been described above, dichroic mirror 36 is configured to allow light other than that in the green wavelength range to pass. Therefore, blue light B2 passes through dichroic mirror 36 and is converged by lens 37, and enters the light tunnel 38. Further, blue light B2 is reflected by the inner surface of the light tunnel 38, is emitted as uniform planar light from the light tunnel 38, and reaches the micromirror element 14.

The projection processor 13 controls the micromirrors of the micromirror element 14 in accordance with gradations of blue components of input image data. In this manner, a blue image which has predetermined gradations on time average is projected.

Through the operation in one frame as described above, projection images of arbitrary colors can be displayed at arbitrary pixel positions on the projection plane, on time average. As in FIG. 3, the light sources are made to emit light in each of fields R, G, and B in the first frame in FIG. 8. Accordingly, equivalence to projection of a white projection image is obtained on time average. Further, in the second frame, the light sources are made to emit light in each of fields R and G. Therefore, equivalence to projection of a yellow projection image is achieved on time average.

As has been described above, according to the present embodiment, blue light sources are provided respectively for exciting the fluorescent material 34 and for blue projection images, and the blue light source for blue projection images is used to time divisionally excite the fluorescent material 34. In this manner, color reproducibility using light in the blue wavelength range can be improved while light emission efficiency of light in the green wavelength range can be more improved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A light source apparatus comprising:
a first blue-light source which emits light in a first blue-wavelength range;
a second blue-light source which emits light in a second blue-wavelength range having wavelengths longer than the wavelengths in the first blue-wavelengths range; and
an optical-path switch controller which time-divisionally performs (1) a first operation of guiding the light in the first blue-wavelength range and the light in the second blue-wavelength range to a first optical-guide system, and (2) a second operation of guiding the light in the first blue-wavelength range to the first optical-guide system and the light in the second blue-wavelength range to a second optical-guide system,
wherein the optical-path controller performs control such that in the first operation, the light in the first blue-wavelength range and the light in the second blue-wavelength range have respectively different planes of polarization.

2. A light source apparatus comprising:
a first blue-light source which emits light in a first blue-wavelength range;
a second blue-light source which emits light in a second blue-wavelength range having wavelengths longer than the wavelengths in the first blue-wavelengths range; and
an optical-path switch controller which time-divisionally performs (1) a first operation of guiding the light in the first blue-wavelength range and the light in the second blue-wavelength range to a first optical-guide system, and (2) a second operation of guiding the light in the first blue-wavelength range to the first optical-guide system and the light in the second blue-wavelength range to a second optical-guide system,
wherein the optical-path controller performs control such that in the second operation, the light in the first blue-wavelength range and the light in the second blue-wavelength range have respectively same planes of polarization.

* * * * *